United States Patent [19]

Oda et al.

[11] Patent Number: 5,037,187
[45] Date of Patent: Aug. 6, 1991

[54] ZOOM LENS MOUNT ASSEMBLY

[75] Inventors: Akira Oda; Hidetoshi Yanagidaira; Seiji Kameoka; Nobuhiro Sakai; Kanji Nakao, all of Nagano; Toshikatsu Atsuta, Tokyo, all of Japan

[73] Assignee: Kyocera Corporation, Kyoto, Japan

[21] Appl. No.: 380,140

[22] Filed: Jul. 14, 1989

[30] Foreign Application Priority Data

| Aug. 12, 1988 | [JP] | Japan | 63-105941 |
| Aug. 12, 1988 | [JP] | Japan | 63-199928 |
| Aug. 26, 1988 | [JP] | Japan | 63-111158 |
| Aug. 26, 1988 | [JP] | Japan | 63-111159 |
| Aug. 31, 1988 | [JP] | Japan | 63-113361 |

[51] Int. Cl.$^5$ .......................... G02B 15/00
[52] U.S. Cl. .......................... 359/699; 354/195.12; 354/400; 359/705
[58] Field of Search .......................... 350/429, 430, 255; 354/400, 195.11, 195.12

[56] References Cited

U.S. PATENT DOCUMENTS

| 4,255,020 | 3/1981 | Yukio | 350/430 |
| 4,307,951 | 12/1981 | Saito et al. | 350/255 |
| 4,466,019 | 8/1984 | Sakashita | 358/229 |
| 4,506,959 | 3/1985 | Hama | 350/430 |
| 4,548,471 | 10/1985 | Schlapp et al. | 350/255 |
| 4,806,000 | 2/1989 | Shiokama et al. | 350/430 |
| 4,834,514 | 5/1989 | Atsuta et al. | 350/429 |

Primary Examiner—Bruce Y. Arnold
Assistant Examiner—Loha Ben
Attorney, Agent, or Firm—Spensley Horn Jubas & Lubitz

[57] ABSTRACT

A zoom lens mount assembly in which a zooming cam frame is moved along the optical axis while rotating therearound and respective movable frames supporting an optical system are driven by such rotation and movement of the cam frame to effect a desired zooming. In another aspect there is provided a focussing cam frame adapted to be moved along the optical axis and to drive a movable frame provided with a focussing optical system and a program lens shutter.

16 Claims, 9 Drawing Sheets

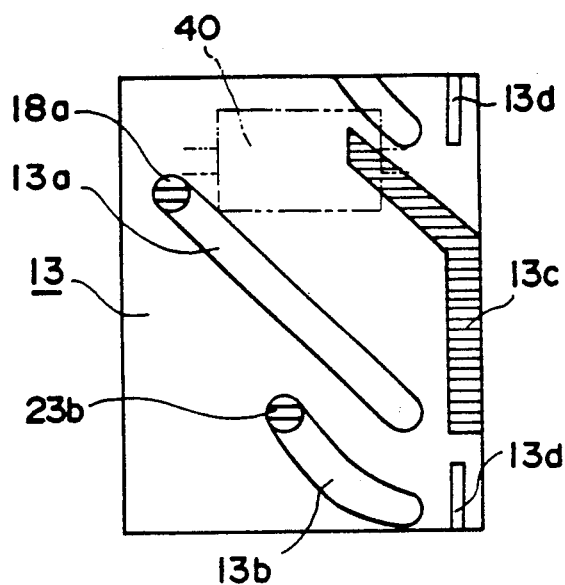
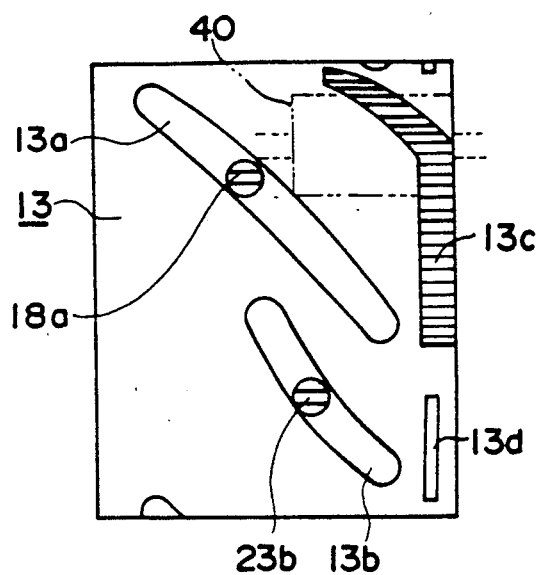
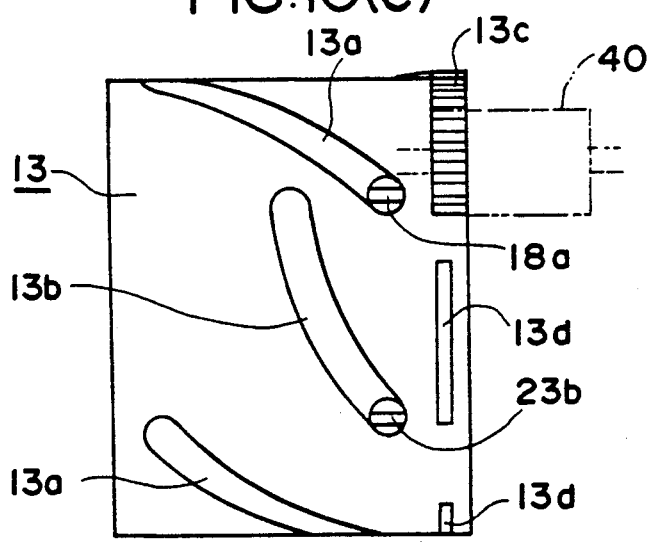

ZOOM LENS MOUNT ASSEMBLY

BACKGROUND OF THE INVENTION

1. Field of the Invention

The present invention relates to a zoom lens mount assembly for use in optical apparatus such as photographic camera, handy movie camera, video camera, copying machine or enlarger.

2. Prior Art

The zoom lens mount assembly generally comprises a cam sleeve having elongate cam tracks extending circumferentially therearound and movable sleeves having fixed cam followers extending through the cam tracks and movably supported inside the cam sleeve to carry magnification-variable lenses as well as compensation lenses so that the respective movable sleeves may be moved in parallel to the optical axis by rotationally driving the cam sleeve to achieve a desired variable magnification.

Specifically, there is provided the cam sleeve stationarily in the direction of the optical axis but rotatably around its own axis and a plurality of movable frames are provided inside the cam sleeve so that the respective movable frames are guided by the cam sleeve and thereby moved along the optical axis in operative association with the cam sleeve as the latter is rotated around its own axis.

The zoom lens mount assembly of this type often includes a movable frame carrying a focussing optical system so arranged that this movable frame may be driven by drive means provided separately of the drive means for the cam sleeve to achieve the focussing control. One example of such well known zoom lens mount assembly contains therein a program lens shutter having shutter blades serving also as an iris diaphragm.

The zoom lens mount assembly of prior art as mentioned above has inevitably encountered first through fourth problems as follows:

FIRST PROBLEM

According to the above-mentioned zoom lens assembly of prior art, the respective movable frames are axially moved by rotationally driving the cam sleeve which is axially unmovable and such arrangement necessarily results in that an area occupied by the cam sleeve should be sufficiently large to accommodate movement of the movable frames. With a consequence, either the cam sleeve or the movable frames should have a correspondingly long dimension, making the lens mount assembly bulky.

SECOND PROBLEM

Recently, a zoom lens mount assembly has been developed, which comprises the parts such as the cam sleeve and the movable frames molded from suitable synthetic resin or the like.

Such lens mount assembly has encountered a problem that it is difficult for the cylindrical products such as the cam sleeve and the movable frames to slidably move with a high precision because these cylindrical products are usually molded into hand-drum-shaped products having diameters reduced at axially middle points, respectively.

Although it may be contemplated that respective metal molds are compensatingly deformed based on previously determined deformation amount of said cylindrical products, such countermeasure is difficult to be realized with the techniques presently available. Correction of the individual cylindrical products once having been deformed would require unacceptably prodigious labor and high skill.

THIRD PROBLEM

When it is desired to construct the above-mentioned zoom lens mount assembly as the lens mount assembly of rear focus type, both the cam sleeves for zooming and for focussing must be disposed at the same position along the optical axis, leading to an enlarged diameter of the mount assembly.

With such lens mount assembly of rear focus type, in addition, the inner cam sleeve must be provided with the cut-out openings or the like in order to avoid a possible interference with the movement of the outer cam sleeve. This necessarily complicates the configuration of the inner cam sleeve and limit a camming operation of this inner cam sleeve.

FOURTH PROBLEM

The zoom lens mount assembly of well known art is often constructed so that the program lens shutter is carried by the moveable frame for zooming.

As a result, the diaphragm has an F-value varying, as the focussing mechanism is operated, and it has usually been required to apply an information on the F-value compensation to the shutter control circuit.

With the arrangement adapted to control the shutter from a microcomputer, for example, the program must contain the F-value variation codes. Compensation of such F-values is to be made concurrently with a desired zooming, so a satisfactory compensation of the F-values is difficult and operation for setting an amount of compensation is considerably troublesome.

SUMMARY OF THE INVENTION

A general object of the present invention is to solve the first through fourth problems as have been set forth above.

The first and second problems are solved, in accordance with the present invention, by a zoom lens mount assembly including a plurality of movable frames adapted to support an optical system and to be moved in operative association with rotation of a zooming cam frame to achieve an optical variable magnification, wherein the zooming cam frame is coupled to one main movable frame so that, around the optical axis, only the zooming cam frame is rotatable but, along the optical axis, the zooming cam frame is movable together with the main movable frame; wherein the cam frame is provided with at least two sets of cam tracks, the first set of cam tracks being operatively associated with stationary cam followers and the second set of cam tracks being operatively associated with cam followers of the other movable frame; and wherein the respective movable frames are moved along the optical axis by rotation of the zooming cam frame and the movement of the cam frame along the optical axis occurring concurrently with the rotation thereof.

According to the present invention, the zooming lens cam frame is thus adapted to be moved together with the respective movable frames, so the area occupied by the cam frame to accommodate the movement of the movable frames can be effectively reduced and thereby the lens mount assembly can be compactly dimensioned.

Even when the respective parts are molded from synthetic resin, the cam frame may be molded, taking the deformation of the main movable frame into consideration to obtain a smooth rotation of the cam frame.

With the arrangement in which the zooming cam frame is movable, the cam frame requires an axially elongate pinion for rotationally driving this cam frame. This requirement can be satisfied, according to the present invention, by providing the drive gear carried on the cam frame with a suitably angled portion.

The third problem is solved, in accordance with the present invention, by the above-mentioned zoom mount assembly, wherein said zooming cam frame is coupled to the one main movable frame on its front side while a focussing cam frame which is independently rotatable around the optical axis but movable along the optical axis together with the zooming cam frame is coupled to the one main movable frame on its rear side; and wherein a movable frame adapted to support a focussing optical system is operatively associated with said focussing cam frame.

The zooming cam frame and the focussing cam frame line up along the optical axis, instead of lying one upon another. Thus, the diameter of the lens mount assembly is not enlarged.

The fourth problem is solved, according to the present invention, by the above-mentioned zoom lens mount assembly, wherein the zooming cam frame is coupled to the one main movable frame on its front side while the focussing cam frame which is independently rotatable around the optical axis but movable along the optical axis together with the zooming cam frame is coupled to the main movable frame on its rear side so that a focussing movable frame is moved by the focussing cam frame along the optical axis; and wherein this focussing movable frame is provided with a lens shutter in addition to the optical system so that the shutter is displaced along the optical axis during operation of zooming and focussing.

The F-value of the iris diaphragm remains unchanged during the operation of focussing, because the lens shutter is moved integrally with the zooming optical system.

BRIEF DESCRIPTION OF THE DRAWINGS

A preferred embodiment of the present invention is illustrated by the accompanying drawings, in which:

FIGS. 10(a), 10(b) and 10(c) are schematic views illustrating a sequential operation of the zooming cam sleeve.

DESCRIPTION OF THE PREFERRED EMBODIMENT

The invention will be described, by way of example, in reference with the accompanying drawings.

Figure 1:
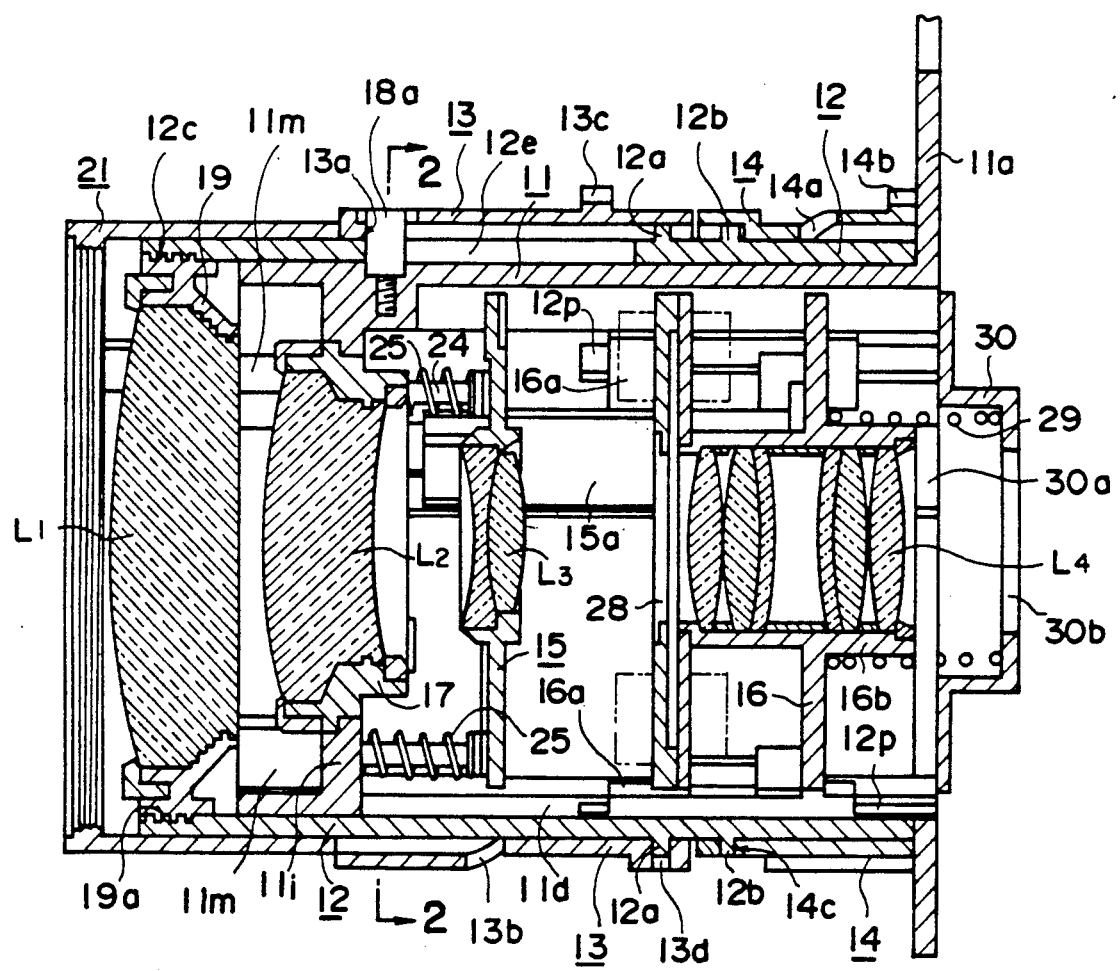
FIG. 1 is a sectional view of the zoom lens mount assembly as taken along a line 1—1 in FIG. 2.
Figure 2:
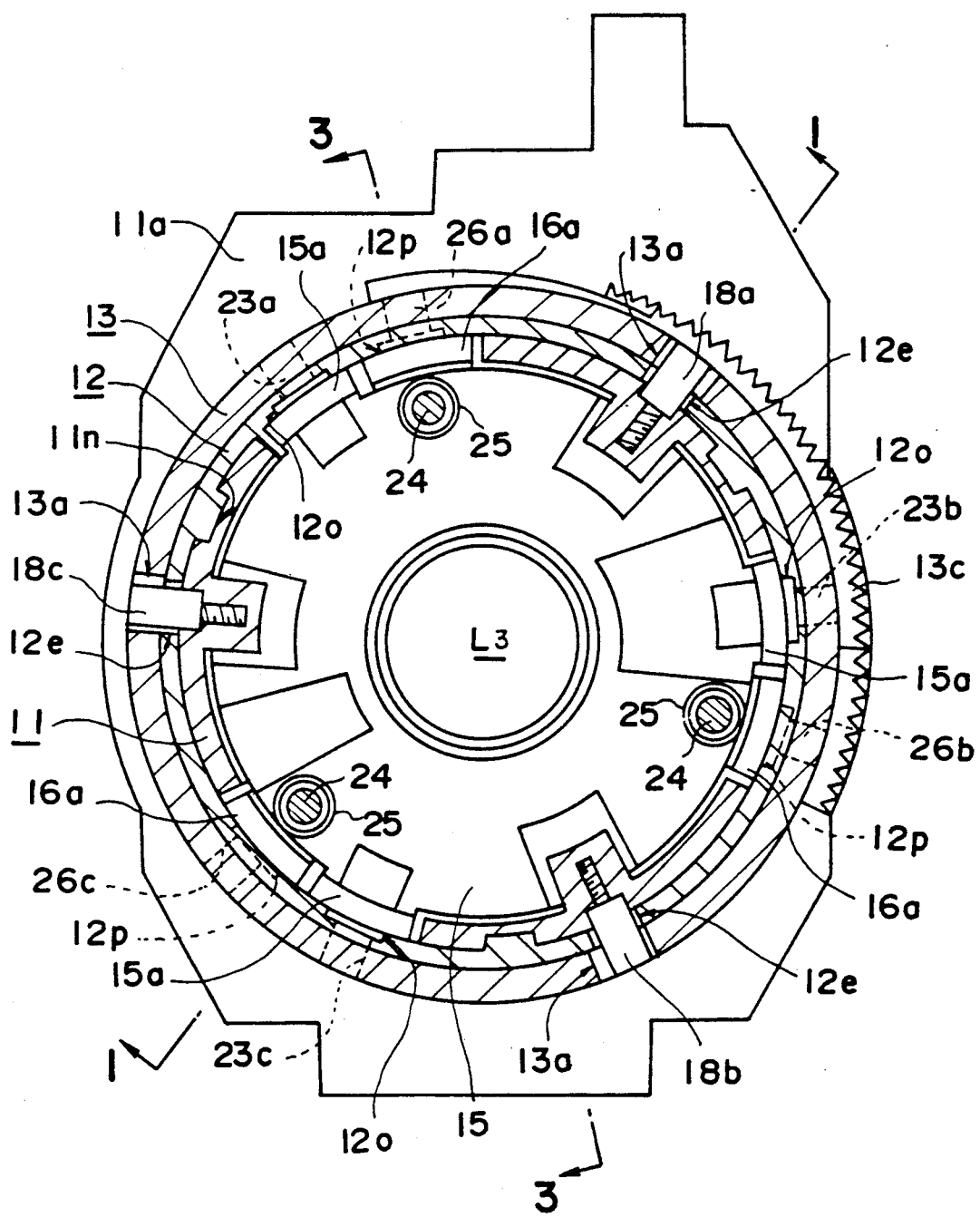
FIG. 2 is a sectional view of the same zoom lens mount assembly as taken along a line 2—2 in FIG. 1.
Figure 3:
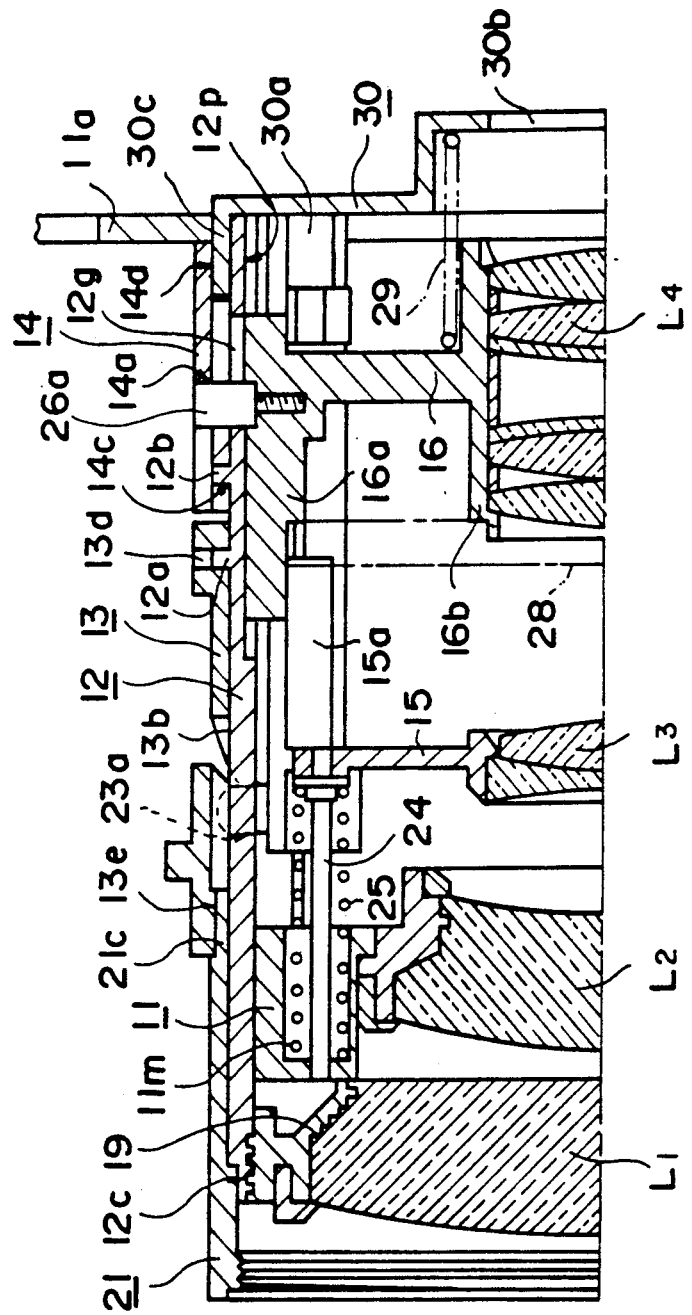
FIG. 3 is a sectional view showing an upper half of the same zoom lens mount assembly as taken along a line 3—3 in FIG. 2.
Figure 4:
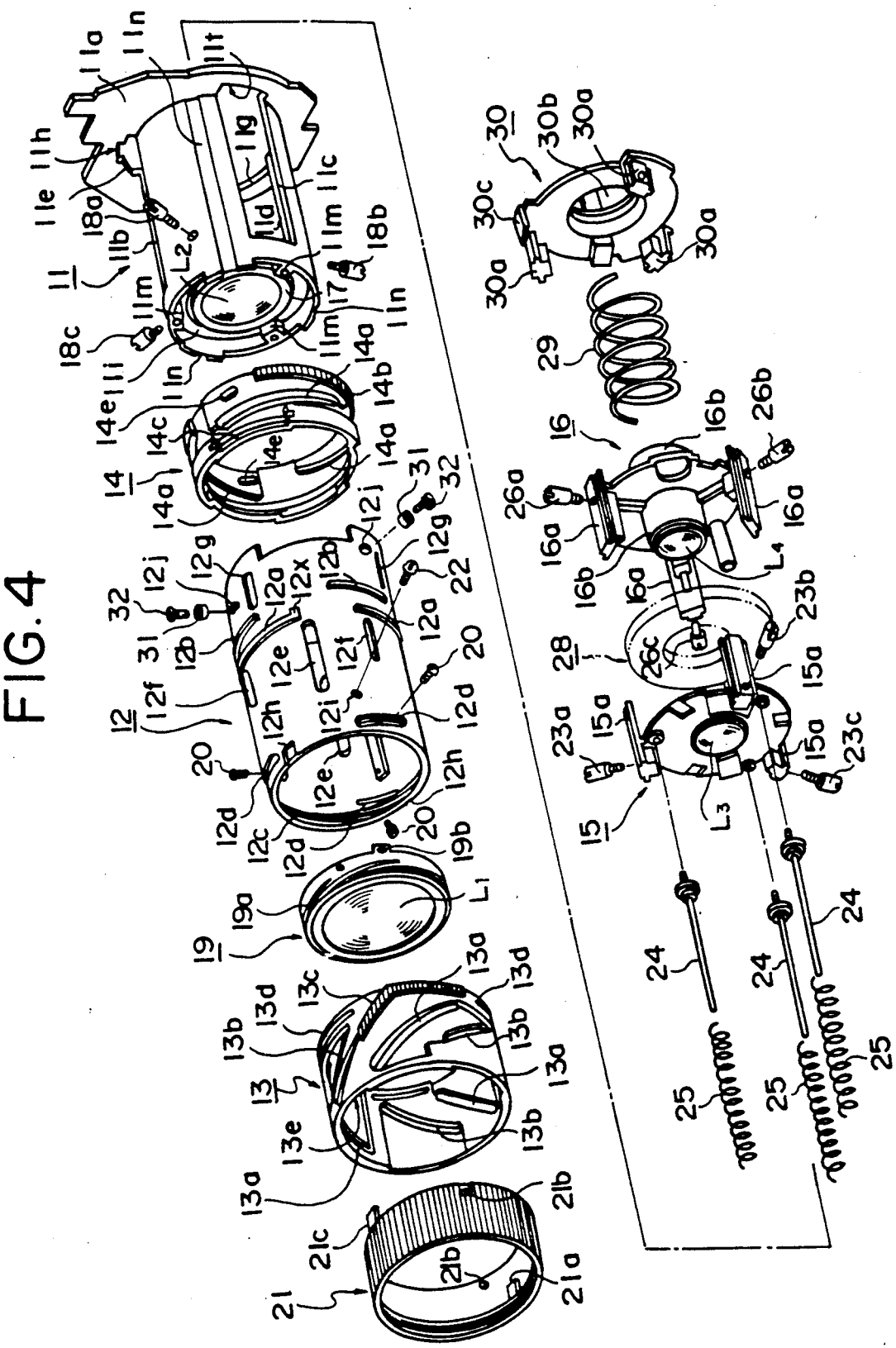
FIG. 4 is a disassembled perspective view of the same zoom lens assembly.

FIG. 1 is a sectional view of a zoom lens mount assembly as taken along a line 1—1 in FIG. 2 which is, in turn, a sectional view of the same zoom lens mount assembly as taken along a line 2—2 in FIG. 1, FIG. 3 shows an upper half of the same zoom lens mount assembly along a line 3—3 in FIG. 2, and FIG. 4 is a disassembled perspective view of the same zoom lens mount assembly.

Referring to these figures, reference numeral 11 designates a cylindrical stationary frame mounted on a camera body or the like, 12 a movable sleeve as a main movable frame adapted to be slidably moved around the outer surface of the stationary frame 11, 13 a zooming cam sleeve rotatably mounted around the movable sleeve 12, 14 a focussing cam sleeve rotatably mounted around the movable sleeve 12 just like the cam sleeve 13, 15 a first movable frame adapted to be moved within the stationary frame 11, and 16 a second movable frame adapted also to be moved within the stationary frame 11 just like the first movable frame 15.

L1 designates a movable lens carried by a front end of the movable sleeve 12, L2 a stationary lens carried by the stationary frame 11, L3 a movable lens carried by the first movable frame 15, and L4 a movable lens carried by the second movable frame 16, wherein variable magnification is obtained by multiplication of a focal distance of the lens L1 by focal distances of the lenses L2, L3, L4, respectively. The lens L4 serves also as a focussing lens.

First of all, the above-mentioned respective parts of the zoom lens mount assembly will be discussed in reference with FIG. 4.

The stationary frame 11 is integrally formed at its rear end with a flange 11a adapted to be fixedly mounted on a lens base plate(not shown) and further provided at equiangular displacements therearound with wide notches 11b, 11c, 11d axially extending from positions adjacent the front end of the frame 11. These notches 11b, 11c, 11d serve to associate the first and second movable frames 15, 16 operatively with the movable sleeve 12 and open at their rear ends. Corresponding to these notches 11b, 11c, 11d, the flange 11a is circumferentially provided with arc-shaped notches 11e, 11f, 11g having the same width as those of the axial notches. It should be understood that a recess 11h formed in an edge of the arc-shaped notch 11e is adapted to receive a stopper 30g used to limit a rotatable range of the focussing cam sleeve 14. The stationary frame 11 is further provided adjacent its front end with a partition-like portion 11i and a lens holder 17 for the stationary lens L2 is secured by screws to this partition-like portion 11i. Additionally, the stationary frame 11 is provided therearound adjacent its front end but a little to its axially middle portion with three cam followers 18a, 18b, 18c secured thereto at circumferentially regular intervals.

Furthermore, the stationary frame 11 is provided at its front end with three spring seats 11m for springs used to bias the first movable frame 15 and provided therearound with three axially extending key grooves 11n along which associated key ridges formed on the movable sleeve 12 are slidable.

Figure 5A:
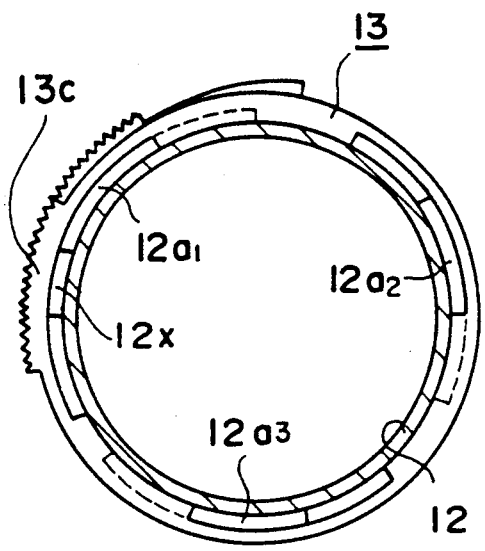
FIG. 5(a) is schematic front view of a zooming cam sleeve.
Figure 6A:
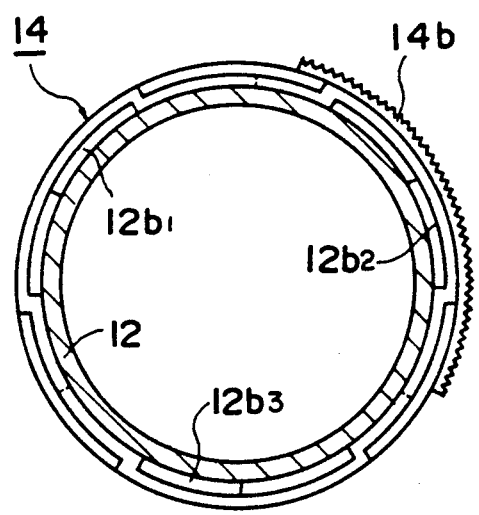
FIG. 6(a) is a schematic front view of a focussing cam sleeve.

The movable sleeve 12 includes arc-shaped ridges 12a, 12b formed circumferentially therearound, by which the both cam sleeves 13, 14 are bayonet-joined to the movable sleeve 12 in front and in rear of each other. These ridges 12a, 12b are circumferentially formed around the movable sleeve 12 and integrally therewith a little to the rear end with respect to the middle position thereof, in parallel to each other, leaving a relatively narrow spacing therebetween. The ridge 12a consists of ridge portions 12a1. 12a2. 12a3. as shown in detail by FIG. 5(a), and the ridge 12b consists of ridge portions 12b1, 12b2, 12b3, as shown in detail by FIG. 6(a).

The movable sleeve 12 is further provided in its inner wall at the front end with a female helicoidal thread 12c adapted to be engaged with a corresponding male helicoidal thread 19a formed around a lens holder 10 to mount the movable lens L1 (i.e., objective). Three slots 12d formed through the movable sleeve 12 at its front end so as to have an inclination corresponding to that of the helicoidal thread 12c are used for shift adjustment and, once the shift adjustment has been done, cap screws 20 are fixedly threaded through the respective slots 12d into corresponding taps 19b formed in the lens holder 19.

Furthermore, the movable sleeve 12 includes slots of various purposes. Specifically, of two sets of axial slots 12e, 12f formed in front of the ridge 12a, the longer slots 12e are formed through the movable sleeve 12 at three locations therearound, through which the respective cam followers 18a, 18b, 18c of the said stationary frame 11 extend while the shorter slots 12f are formed through the movable sleeve 12 at three locations therearound, through which respective cam followers 23a, 23b, 23c, which will be described later, of the first movable frame 15 extend. Another set of axial slots 12g provided behind the ridge 12b are also formed through the movable sleeve 12 at three locations therearound, through which respective cam followers 26a, 26b, 26c, which will be described later, of the second movable frame 16 extend. In addition, the movable sleeve 12 includes a positioning groove 12h for a filter frame 21 as will be mentioned later, a tap 12i into which a cap screw 22 is threaded to secure the filter frame 21, and three small through-holes 12j used to secure a spring seat 30 which will be also described later. The movable sleeve 12 is further provided in its inner wall with axial grooves 12o, 12p along which the first and second movable frames 15, 16 are slidable, respectively. (See FIG. 2.)

The filter frame 21 is put on the front end of the movable sleeve 12 with a projection 21a provided on its inner wall 21d being engaged into the positioning groove 12h and then the respective cap screws 22 are threaded through respective threaded holes 21b into the respective taps 12i formed in the movable sleeve 12 to secure the filter frame 21 to the movable sleeve 12. Reference numeral 21c designates a stopper serving to limit a rotatable range of the cam sleeve 13 which will be described more in detail later.

The cam sleeve 13 for zooming purpose is provided circumferentially at equiangular intervals, respectively, with a first set of three cam tracks 13a through which the respective cam followers 18a, 18b, 19c of the stationary frame 11, a second set of cam tracks 13b through which the respective cam followers 23a, 23b, 23c of the first movable frame 15 extend, and a rearwardly angular drive gear 13c extending from the rear end to a point adjacent the axially middle point.

The cam sleeve 13 is circumferentially formed with three arc-shaped recesses being engageable with the respective ridges 12a of the movable sleeve 12 to form a bayonet structure and three arc-shaped slots 13d separating these recesses from one another. Arc-shaped cut-out portions 13e circumferentially formed in the inner wall of the cam sleeve 13 serve to limit a rotatable range thereof. (See FIG. 5(b).)

The focussing cam sleeve 14 has three cam tracks 14a circumferentially formed therearound at equiangular intervals. The cam sleeve 14 is further provided at its rear end with a drive gear 14b, at its front end with three arc-shaped slots 14c circumferentially formed therethrough at equiangular intervals so as to be engaged with the respective ridges 12b of the movable sleeve 12 to form a bayonet structure, and also at its front end but in its inner wall with three arc-shaped recesses circumferentially formed with displacements from the respective arc-shaped slots 14c.

The cam sleeve 14 has its rotatable range limited by arc-shaped cut-out portions 14d circumferentially extending along the inner periphery at the rear end. (See FIG. 6(b).)

The first movable frame 15 comprises a disc centrally carrying the movable lens L3, having a diameter slightly smaller than that of the stationary frame 11, and provided on its peripheral edge with three slider arms 15a extending in parallel to the optical axis of the movable lens L3 so as to be engaged through the respective wide notches 11b, 11c, 11d of the stationary frame 11 with the respective axial grooves 12o formed in the inner wall of the movable sleeve 12. (See FIG. 2.)

The cam followers 23a, 23b, 23c are secured to the associated slider arms 15a and, as has previously been described, extend through the respective axial slots 12f of the movable sleeve 12 into the second cam tracks 13b of the cam sleeve 13.

The first movable frame 15 is normally biased rearwards by three small diametered guide rods 24 secured to the front side of the frame 15 and axially extending therefrom and three springs 25 through which the respective guide rods 24 extend. Each guide rod 24 extends at one end through the associated spring seat 11m formed in the stationary frame 11 and the associated spring 25 bears against this spring seat 11m. (See FIG. 3).

The second movable frame 16 is substantially similar to the first movable frame 15 except that the second movable frame 16 is centrally provided with a lens holder sleeve 16b for the movable lens L4 (i.e., the focussing lens).

This second movable frame 16 also comprises a disc which is provided at equiangular intervals on its periphery with three axially extending slider arms 16a adapted to be engaged through the respective axial notches 11b, 11c, 11d into the respective axial grooves 12p formed in the inner wall of the movable sleeve 12. (See FIG. 2.)

The slider arms 16a carry the cam followers 26a, 26b, 26c secured thereto, respectively, and these cam followers 26a, 26b, 26c extend through the respective axial slots 12g into the respective cam tracks 14a formed in the cam sleeve 14.

The second movable frame 16 is provided on its front side with a program lens shutter 28 screw-secured thereto, which comprises shutter blades serving also as an iris diaphragm. The second movable frame 16 is normally biased forward by a spring 29. The spring 29 is disposed between the second movable frame 16 and a spring bearing frame 30 in the form of a disc provided at equiangular intervals on its peripheral edge with three positioning arms 30a axially extending and with an aperture 30b extending through a central recess so that a light beam may pass through this aperture. The stopper 30c is formed integrally with the spring bearing frame 30 to limit a rotatable range of the cam sleeve 14.

The spring bearing frame 30 is secured to the rear end of the movable sleeve 12 with the respective positioning arms 30a being engaged into the associated axial grooves 12o formed in the inner wall of the movable sleeve 12. More specifically, a cap screw 32 is inserted together with a resilient ring 31 through each small through-hole 14e of the cam sleeve 14 into the associated small hole 12j of the movable sleeve 12 and the cap screw 32 is fixedly threaded into the associated positioning arm 30a. (See FIG. 7.)

Simultaneously, the stopper 30c is engaged through the recess 11h formed in the flange 11a into the arc-shaped cut-out portion 14d.

Now it will be described how the respective parts as have been mentioned hereinabove should be assembled together.

First, the zooming cam sleeve 13 is put on the outer periphery of the movable sleeve 12 from the front side thereof, with the ridges 12a of the movable sleeve 12 being engaged with the corresponding arc-shaped slots 13d of the cam sleeve 13 in the well known bayonet fashion, allowing the cam sleeve 13 to be rotatable around the sleeve axis.

Then, the focussing cam sleeve 14 is put on the outer periphery of the movable sleeve 12 from the rear side thereof, with the ridges 12b of the movable sleeve 12 being engaged with the corresponding arc-shaped slots 14c of the cam sleeve 14 in the bayonet fashion just as in the case of the cam sleeve 13, allowing the cam sleeve 14 to be rotated around the sleeve axis.

The movable sleeve 12 having the both cam sleeves 13, 14 thus coupled thereto is put on the outer periphery of the stationary frame 11 from the front side thereof, with the key ridges formed on the inner wall of the movable sleeve 12 (corresponding to the key grooves 11n of the stationary frame 11) being slidably engaged with the key grooves 11n so as to determine a circumferential position of the movable sleeve 12.

Next, the first movable frame 15 having the guide rods 24 secured thereto and respectively carrying the associated springs 25 therearound is inserted into the stationary frame 11 from the rear side thereof, with the respective slider arms 15a being positioned between the respective pairs of the adjacent notches 11b, 11c, 11d of the stationary frame 11 and the ridges of the respective slider arms 15a being engaged with the associated grooves 12o formed in the inner wall of the movable sleeve 12. The front ends of the respective guide rods 24 are made projected forward beyond the respective spring seats 11m of the stationary frame 11, as shown by FIG. 3.

The cam followers 23a, 23b, 23c are fixedly threaded through the respective second cam tracks 13b of the cam sleeve 13, then through the respective axial slots 12f of the movable sleeve 12 into the respective slider arms 15a of the first movable frame 15 which has been inserted into the stationary frame 11.

The cam followers 18a, 18b, and 18c are fixedly threaded through the respective first cam tracks 13a of the cam sleeve 13, then through the respective axial slots 12e of the movable sleeve 12 into the stationary frame 11.

Thereafter, the second movable frame 16 is also inserted into the stationary frame 11 from the rear side thereof and the second movable frame 16 includes the program lens shutter 28 which has previously been mounted thereto.

Concerning this second movable frame 16 also, the respective slider arms 16a are positioned between the respective pairs of the adjacent notches 11b, 11c, 11d of the stationary frame 11.

More specifically, the ridges of the respective slider arms 16a are positioned in parallel to the respective slider arms 15a of the first movable frame 15 and inserted into the associated grooves 12p formed in the inner wall of the movable sleeve 12.

The cam followers 26a, 26b, 26c are fixedly threaded through the respective cam tracks 14a of the cam sleeve 14, then through the respective axial slots 12g of the movable sleeve 12 into the respective slider arms 16a of the second movable frame 16 which has been inserted into the stationary frame 11.

As described above, the cam followers 23a, 23b and 23c mounted on the slider arms 15a slide within the axial slots 12f, and the cam followers 26a, 26b and 26c mounted on the slider arms 16a slide within the axial slots 12g, wherein the slider arms 15a and 16a engage the grooves 12o and 12p, respectively, provided in the internal wall of the movable sleeve 12. It should therefore be understood that the grooves 12o are longitudinally aligned with the respective axial slots 12f, and the movable sleeve 12 are also longitudinally aligned with the respective axial slots 12g. (See FIG. 2 and FIG. 4)

Figure 7:
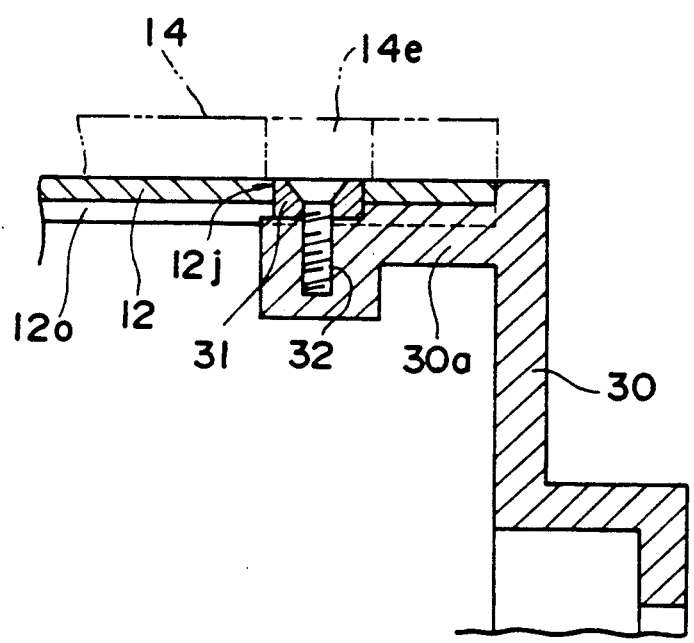
FIG. 7 is a fragmentary view of a screw-securing structure to secure a spring bearing frame to a movable sleeve.

Now, the spring bearing frame 30 is secured to the rear end of the movable sleeve 12 after insertion of the spring 29, with the respective positioning arms 30a being engaged with the respective grooves 12o formed in the inner wall of the movable sleeve 12 into which the respective slider arms 15a of the first movable frame 15 have already been inserted and, as has previously been mentioned, with the cap screws 32 being fixedly threaded together with the associated resilient ring 31 through the respective small holes 14e into the respective positioning arms 30a, as seen from FIG. 7.

Figure 6B:
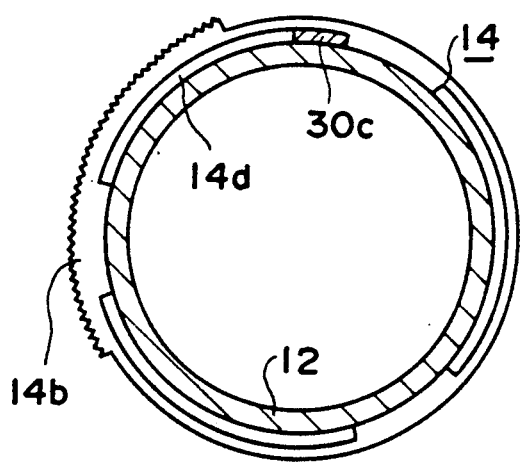
FIG. 6(b) is a schematic rear view of the same focussing cam sleeve.

Once the spring bearing frame 30 has been fixedly mounted, the stopper 30c comes into the corresponding arc-shaped cut-out portion 14d of the cam sleeve 14, as shown by FIG. 6(b), to limit a rotatable range of the cam sleeve 14. Then, the lens holder 17 is screw-clamped on the partition-like portion 11i of the stationary frame 11 and the lens holder 19 is mounted on the front end of the movable sleeve 12 by threading of the helicoidal screws 12c, 19a. In this operation of mounting, the lens holder 19 is secured by the cap screws 20 after the lens holder 19 has been rotated by an appropriate amount and shift adjusted.

Finally, the filter frame 21 is secured around the outer periphery of the movable sleeve 12 from the front side thereof, with the projection 21a being brought into engagement with the positioning groove 12h of the movable sleeve 12 and the cap screws 22 being fixedly threaded into the respective threaded holes 21b.

Figure 5B:
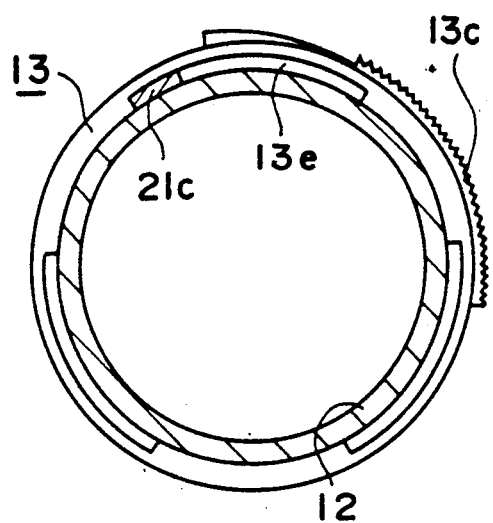
FIG. 5(b) is a schematic rear view of the same zooming cam sleeve.

Once the filter frame 21 has been fixedly mounted, the stopper 21c thereof comes into the corresponding arc-shaped cut-out portion 13e of the cam sleeve 13, as seen from FIG. 5(b), to limit a rotatable range of the cam sleeve 13.

It is also possible to define one end of the rotatable range of the cam sleeve 13 by an arrangement such that a hook-shaped portion 12x formed on one end of each ridge 12a bears against a corresponding stopper formed on the inner wall of the cam sleeve 13 associated with the arc-shaped slot 13d.

The zoom lens mount assembly completely assembled in the above-mentioned manner presents a cross-section as shown by FIGS. 1 through 3.

This zoom lens mount assembly operates as follows:

FIGS. 1 through 3 illustrate the zoom lens assembly as taking its wide angle position from which the respective cam surfaces of the first cam tracks 13a slide on the cam followers 18a, 18b, 18c secured to the stationary frame 11 as the zooming cam sleeve 13 is rotated counterclockwise as viewed from the front, and thereby the cam sleeve 13 is moved forward. The cam sleeve 13 is rotationally driven by the pinion operatively associated with the electromotor through the drive gear 13c adapted to be engaged with the pinion.

The movable sleeve 123 is unrotatably moved forward together with the cam sleeve 13, since the movable sleeve 12 is bayonet-joined to the cam sleeve 13. During such movement, the axial slots 12e function as the guide slots for the associated cam followers.

The focussing cam sleeve 14 is also unrotatably moved forward together with the movable sleeve 12 as the cam sleeve 13 is moved as mentioned above, since the focussing cam sleeve 14 is bayonet-joined to the movable sleeve 12.

Rotation of the cam sleeve 13 causes the respective second cam tracks 13b to thrust the cam followers 23a, 23b, 23c respectively extending through these cam tracks and thereby moves the first movable frame 15, following the configuration of the second cam tracks 13b.

The second movable frame 16 is moved forward together with the cam sleeve 14, since the latter is adapted to be unrotatably moved.

Figure 8:
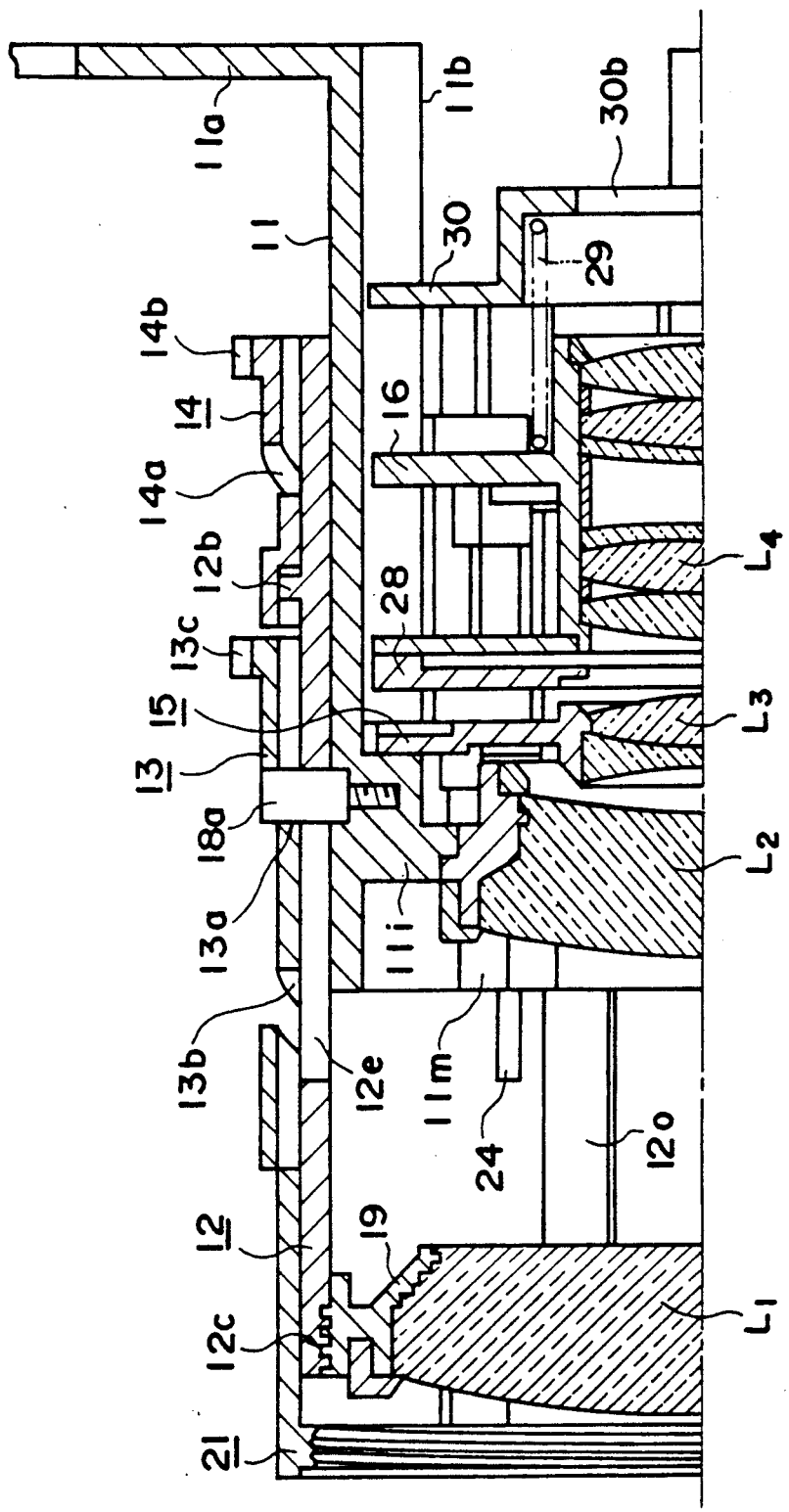
FIG. 8 is a fragmentary sectional view illustrating operation of zooming.

FIG. 8 shows the zoom lens mount assembly which has transferred to the telescopic position as a result of the above-mentioned zooming operation.

It should be understood that, during the zooming operation, the biasing effect of the spring 25 is exerted upon the cam sleeve 13 through the first movable frame 15, the cam followers 23a, 23b, 23c, and the second cam tracks 13b, moving this cam sleeve 13 rearward. Consequently, during zooming from the wide angle position to the telescopic position as mentioned above, the cam followers 23a, 23b, 23c are thrusted forward by the right side walls of the respective second cam tracks 13b, thereby the first movable frame 15 is moved forward, and the spring 25 is compressed. During zooming from the telescopic position as shown by FIG. 8 back to the wide angle position, the cam sleeve 13 is rotationally driven in the direction reverse to that in the case of the zooming from the wide angle position to the telescopic position.

Thus the cam sleeve 13 is moved rearward and, in consequence, the movable sleeve 12 as well as the cam sleeve 14 are unrotatably moved rearward together with the cam sleeve 13.

As a result, the second movable frame 16 is also moved rearward together with the cam sleeve 14 while the first movable frame 15 is moved as the cam sleeve 13 is reversely rotated. In this manner, the zoom lens mount assembly finally restores the wide angle position as shown by FIGS. 1 through 3.

Focussing operation causes the cam sleeve 14 to be rotationally driven. Specifically, the cam sleeve 14 is rotationally driven by a motor driven pinion through the drive gear 15b adapted to be engaged with this pinion.

Figure 9:
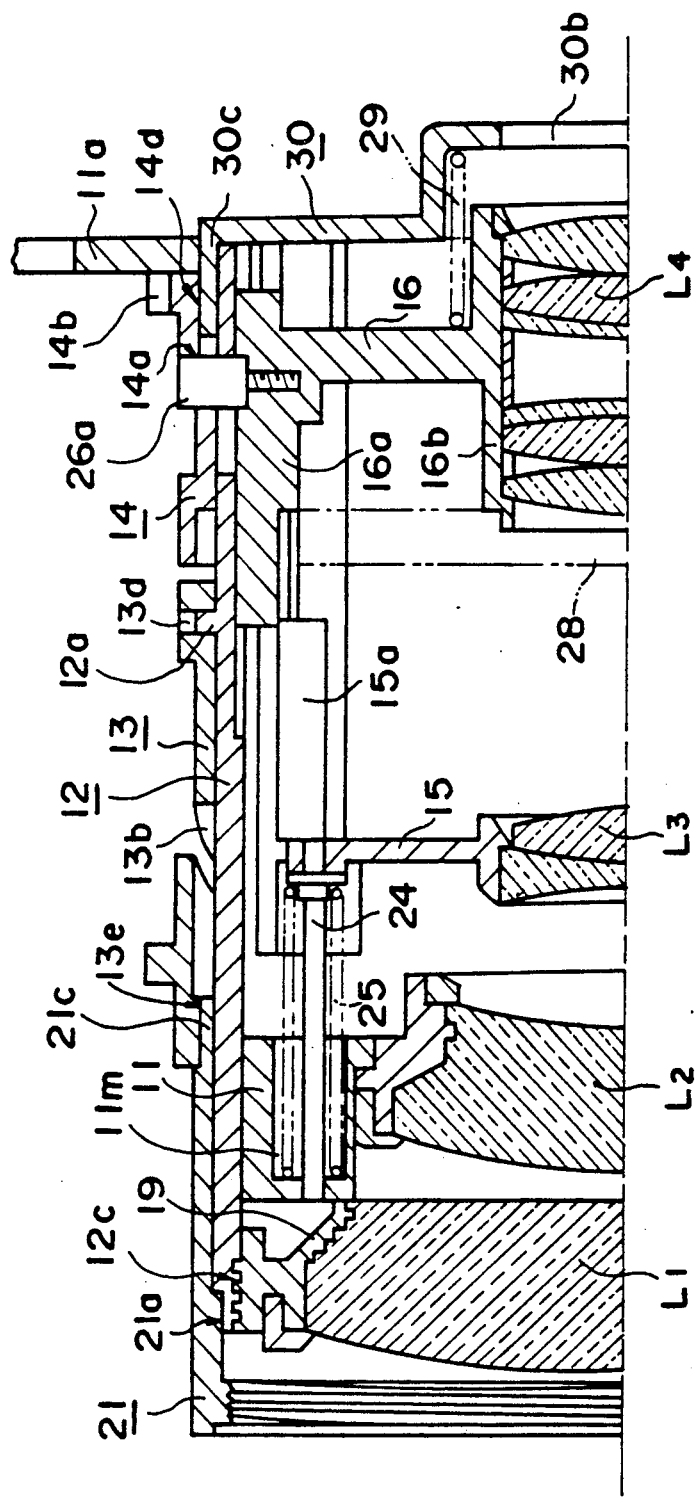
FIG. 9 is a view similar to FIG. 8 illustrating operation of focussing.

Rotation of the cam sleeve 14 from the wide angle position as shown by FIGS. 1 through 3 causes the second movable frame 16 alone to be unrotatably moved. For example, rotation of the cam sleeve 14 occurring counterclockwise as seen from the front causes the cam surfaces of the respective cam tracks 14a to thrust the associated cam followers 26a, 26b, 26c, and thereby the second movable frame 16 is moved rearward as shown by FIG. 9 to achieve focussing. The cam sleeve 14 is moved together with the movable sleeve 12 by zooming operation, as has been explained above, so the cam sleeve 14 may be rotationally driven in the respective stages of the zooming operation and thereby the second movable frame 16 may be moved selectively forward or rearward in order to achieve the desired focussing. It should be noted that the second movable frame 16 is normally biased forward and, therefore, the cam followers 26a, 26b, 26c are thrusted by the left side walls of the respective cam tracks 14a during the focussing operation.

By normally biasing the first and second movable frames 15, 16 under the effect of the associated springs 25, 26, as in the embodiment herein described and illustrated, the respective cam followers are forced to bear against the one side walls of the respective cam tracks. This feature is significant in that no high precision is required for the cam track widths of the cam sleeves and molding of the cam sleeves and the other parts from synthetic resin is substantially facilitated.

FIGS. 10(a). 10(b) and 10(c) illustrate how the zooming cam sleeve 13 is rotationally driven. It should be understood here that the pinion 40 is unmovable in the direction of the optical axis and rotated by an electromotor.

When the zoom lens mount assembly is in its wide angle position as shown by FIGS. 1 through 3, the pinion 40 is in engagement with the drive gear 13c in a manner as shown by FIG. 10(a).

The cam sleeve 13 rotates counterclockwise as the pinion 40 rotates from the wide angle position clockwise as viewed in FIG. 10(a) and, as seen in FIG. 10(b), the cam sleeve 13 moves in the direction of the optical axis simultaneously with the rotation around its own axis.

A position at which the drive gear 13c is in engagement with the pinion 40 moves from right to left as seen in FIG. 10(c), as the cam sleeve 13 continues to rotate and move towards the telescopic position of FIG. 8.

Reverse rotation of the pinion 40 causes rotation and movement of the cam sleeve 13 from the telescopic position back to the wide angle position in the sequence of FIGS. 10(c), 10(b) and 10(a).

As will be apparent from the foregoing description in reference with FIGS. 10(a), 10(b) and 10(c), the rearwardly angled drive gear 13c provided on the cam sleeve 13 not only permits the cam sleeve 13 to be rotationally driven through the pinion which is substantially shorter than the movement extent of the cam sleeve 13 but also permits the drive gear 13c to be molded integrally with the cam sleeve 13 so far as the cam sleeve 13 is molded from synthetic resin.

It should be understood that the drive gear 13c may be, instead of said rearwardly angled one, a linear gear or a curved gear inclined from the rear end to the front end of the cam sleeve 13.

What is claimed is:

1. Zoom lens mount assembly comprising:

an optical system having an optical axis;

a plurality of movable frames including a main movable frame adapted to support the optical system, at least one of the movable frames having a plurality of cam followers;

a zooming cam frame for moving the plurality of movable frames in operative association with rotation of said zooming cam frame to achieve an optical variable magnification, said zooming cam frame being coupled to said main movable frame of the plurality of movable frames so that, around the optical axis, only said zooming cam frame is rotatable but, along the optical axis, said zooming cam frame is movable together with said main movable frame;

a stationary frame having stationary cam followers; and at least first and second sets of cam tracks provided on said zooming cam frame, the first set of cam tracks being operatively associated with said stationary cam followers and the second set of cam tracks being operatively associated with the cam followers of the one movable frame wherein the respective movable frames are moved along the optical axis by rotation of said zooming cam frame and the movement of said zooming cam frame along the optical axis occurs concurrently with said rotation thereof.

2. Zoom lens mount assembly as recited in claim 1, wherein the zooming cam frame is circumferentially provided therearound with arc-shaped slots while said main movable frame is circumferentially provided therearound with a first set of arc-shaped ridges so that said first set of arc-shaped ridges are slidably received by said arc-shaped slots to form a bayonet structure and thereby said zooming cam frame is rotatable with respect to said main movable frame but operatively associated with said main movable frame so as to be movable together with said main movable frame in the direction of the optical axis.

3. Zoom lens mount assembly as recited in claim 1 for use with a motor driven pinion, wherein said zooming cam frame is provided therearound with a drive gear comprising a gear portion angled with respect to the direction of rotation of said zooming cam frame so that said cam frame is driven by a motor driven pinion adapted to be engaged with said drive gear.

4. Zoom lens mount assembly as recited in claim 1 further comprising a focussing optical system and a focussing cam frame wherein said zooming cam frame is coupled to said main movable frame on its front side while said focussing cam frame is coupled to said main movable frame on its rear side so that said focussing cam frame is rotatable around the optical axis independently from the zooming cam frame but is movable along the optical axis together with said zooming cam frame; said assembly further comprising a focussing movable frame of the plurality of movable frames adapted to support the focussing optical system and operatively associated with said focussing cam frame.

5. Zoom lens mount assembly as recited in claim 4, wherein said focussing cam frame is circumferentially provided with arc-shaped slots while said main movable frame is circumferentially provided with a second set of arc-shaped ridges so that said second set of arc-shaped ridges are slidably received by said arc-shaped slots to form a bayonet structure and thereby said focussing cam frame is rotatable with respect to said main movable frame but operatively associated with said main movable frame so as to be moved together with said main movable frame in the direction of the optical axis.

6. Zoom lens mount assembly as recited in claim 4, wherein said focussing movable frame is provided with lens shutter assembly attached thereto in addition to the focussing optical system so that said shutter assembly is displaced along the optical axis during rotation of said zooming cam frame and said focussing cam frame.

7. Zoom lens mount assembly comprising:

an optical system having an optical axis;

a generally cylindrical stationary frame including stationary cam followers;

a plurality of movable frames adapted to support the optical system, the plurality of movable frames including a generally cylindrical main movable frame having a plurality of cam slots, said main movable frame being slidably received about an exterior surface of said stationary frame, and said stationary cam followers slidably engaging the corresponding number of the plurality of cam slots; and a generally cylindrical zooming cam frame slidably received about an exterior surface of said main movable frame for moving the plurality of movable frames in operative association with rotation of said zooming cam frame to achieve an optical variable magnification, said zooming cam frame being in camming engagement with said stationary cam followers of said stationary frame and being coupled to said main movable frame so that rotation of said zooming cam frame around an optical axis causes said main movable frame together with said cam frame to move along the optical axis with respect to said stationary frame.

8. Zoom lens mount assembly as recited in claim 7 wherein said zooming cam frame has at least first and second sets of cam tracks, the first set of cam tracks being operatively associated with said stationary cam followers and the second set of cam tracks being operatively associated with cam followers of another movable frame of the plurality of movable frames, wherein the respective movable frames are moved along the optical axis by rotation of said zooming cam frame and the movement of said zooming cam frame along the optical axis occurs concurrently with said rotation thereof.

9. Zoom lens mount assembly as recited in claim 8, wherein said zooming cam frame has arc-shaped slots provided circumferentially therearound, and said main movable frame has a first set of arc-shaped ridges provided circumferentially therearound so that said first set of arc-shaped ridges are slidably received by said arc-shaped slots to form a bayonet structure wherein said zooming cam frame is rotatable with respect to said main movable frame but operatively associated with said main movable frame so as to be movable together with said main movable frame in the direction of the optical axis.

10. Zoom lens mount assembly as recited in claim 8, wherein said zooming cam frame has a drive gear provided on the exterior surface thereof, said drive gear comprising a gear portion angled with respect to the direction of rotation of said zooming cam frame so that said cam frame is driven by a motor driven pinion adapted to be engaged with said drive gear.

11. Zoom lens mount assembly as recited in claim 8, further comprising a focussing cam frame slidably received about the exterior surface of said main movable frame, said focussing cam frame being rotatable around the optical axis independent of said zooming cam frame but movable along the optical axis together with said zooming cam frame, wherein said zooming cam frame is coupled to said main movable frame on its front side while said focussing cam frame is coupled to said main movable frame on its rear side; said assembly further comprising a focussing movable frame of the plurality of movable frames adapted to support the focussing optical system and operatively associated with said focussing cam frame.

12. Zoom lens mount assembly as recited in claim 11, wherein said focussing cam frame has arc-shaped slots provided circumferentially therearound, and said main movable frame has a second set of arc-shaped ridges circumferentially provided therearound so that said second set of arc-shaped ridges are slidably received by said arc-shaped slots to form a bayonet structure whereby said focussing cam frame is rotatable with respect to said main movable frame but operatively associated with said main movable frame so as to be moved together with said main movable frame in the direction of the optical axis.

13. Zoom lens mount assembly as recited in claim 11, wherein said focussing movable frame carries lens shutter means fixed thereto so that said shutter means is displaced along the optical axis together with said focussing optical system during rotation of said zooming cam frame and said focussing cam frame.

14. A zoom lens mount assembly, comprising:
an optical system comprising a plurality of lenses aligned to define an optical axis;
a generally stationary frame having a cam follower;
a main movable frame slidingly carried by the stationary frame and adapted to carry one or more lenses of the optical system; and
a generally cylindrical zooming cam frame slidingly and rotationally carried by the stationary frame and rotationally coupled to the main movable frame, said zooming cam frame having a camming surface positioned to engage the stationary cam follower of the stationary frame upon rotation of the zooming cam frame and shaped so as to axially displace, upon rotation of the zooming cam frame, the zooming cam frame and the main movable frame which is rotationally coupled to the zooming cam frame.

15. The assembly of claim 14 further comprising an additional movable frame slidingly carried by the stationary frame and adapted to carry at least one lens of the optical system, said additional movable frame having a second cam follower and said zooming cam frame having a second camming surface positioned to engage the cam follower of the additional movable frame upon rotation of the zooming cam frame and shaped so as to axially displace, upon rotation and axial displacement of the zooming cam frame, the additional movable frame.

16. The assembly of claim 15 further comprising a generally cylindrical focusing cam frame rotationally carried by the main movable frame, said assembly further comprising a second additional movable frame slidingly carried by the stationary frame and adapted to carry at least one lens for focusing the optical system, said second additional movable frame having a third cam follower and said focusing cam frame having a third camming surface positioned to engage the cam follower of the second additional movable frame upon rotation of the focusing cam frame and shaped so as to axially displace, upon rotation of the zooming cam frame, the second additional movable frame.

* * * * *